UNITED STATES PATENT OFFICE.

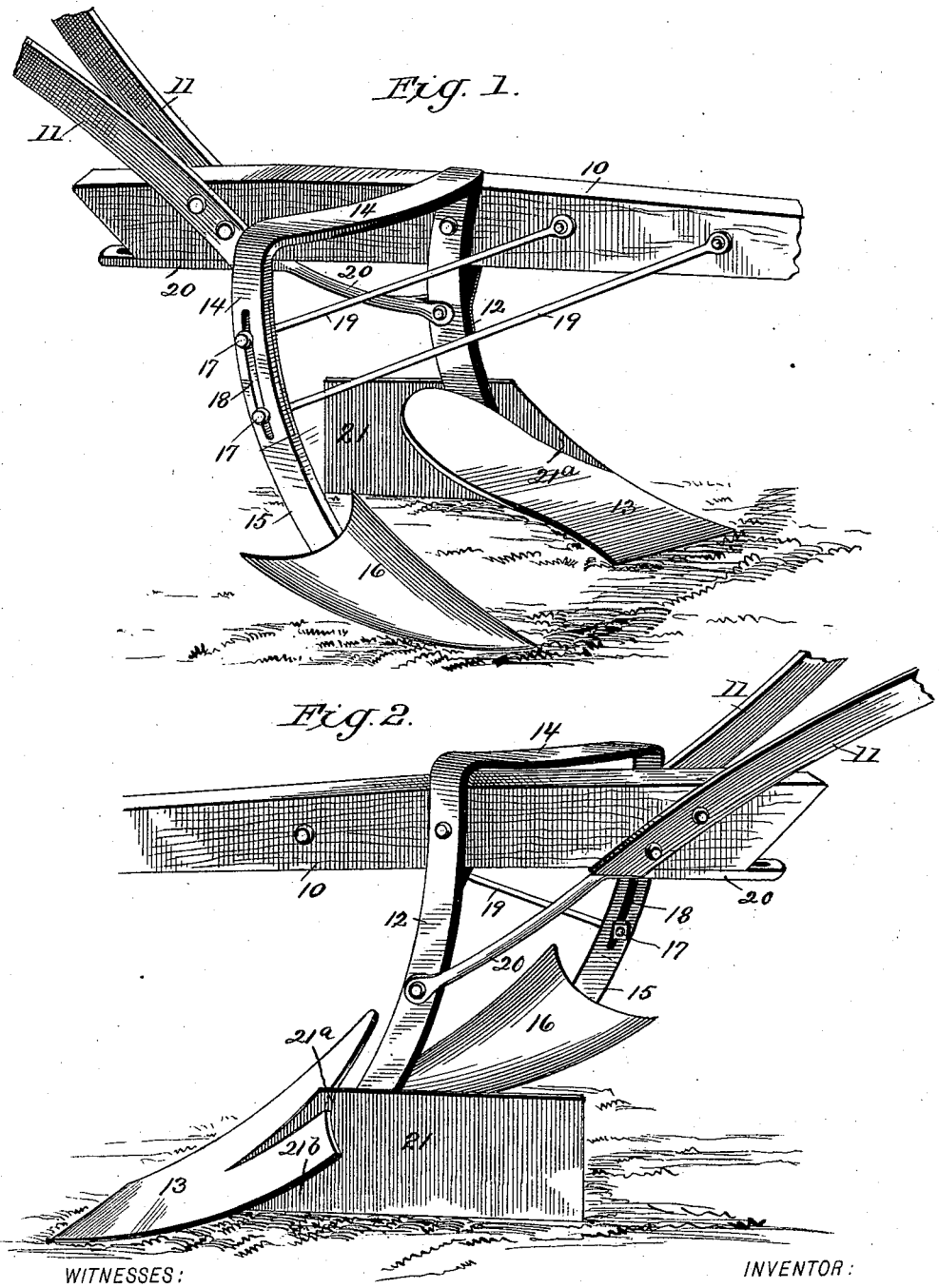

JOHN P. COUCH, OF HENRIETTA, TEXAS.

PLOW.

SPECIFICATION forming part of Letters Patent No. 485,457, dated November 1, 1892.

Application filed April 11, 1892. Serial No. 428,733. (No model.)

*To all whom it may concern:*

Be it known that I, JOHN P. COUCH, residing at Henrietta, in the county of Clay and State of Texas, have invented certain new and useful Improvements in Plows, of which the following is a specification.

This invention relates to an improved cultivator-plow for "barring" and "dirting" cotton-plants, and it can also be used in the cultivation of other small plants.

The objects of my invention are to provide a plow of this character that shall perform both operations at one and the same time, one that is exceedingly cheap and simple, one that will always move in a straight line and protect the plants being "barred," and one that requires very little more power than an ordinary plow.

My invention consists in the peculiar construction of the several parts and their novel combination or arrangement, whereby these objects are accomplished, as more fully hereinafter described and claimed.

In the drawings forming a part of this specification, Figure 1 is a perspective view on the mold-board side. Fig. 2 is a view from the landside.

Referring to the drawings, 10 indicates the plow stock or beam, and 11 11 the handles attached thereto. Connected to one side of the beam 10 is the main standard 12, carrying the mold-board plow 13 at its lower end. A horizontal laterally-projecting bar 14 is connected with the upper end of the main standard, the outer end of said bar being bent downwardly at right angles, and to said pendent end is secured an auxiliary standard 15, carrying the shovel-plow 16. The pendent end of the bar 14 and the auxiliary standard 13 are connected by means of the bolts 17 17, passing through the longitudinal slots 18 18 in the adjacent ends, and by means of these slots the shovel-plow can be adjusted vertically to the desired degree.

Brace-rods 19 19 are secured to the side of the beam 10 and connected with the pendent end and auxiliary standard at their juncture, the bolts 17 serving, also, to secure said braces to these parts. A longitudinally-adjustable brace 20 is secured to the under side of the stock or beam near its rear end, the forward end of said brace being connected with the main standard, and by adjusting the brace back and forth the angle of the mold-plow may be changed, as desired. The shovel-plow 16 is of the usual form. The mold-board plow, however, is of novel construction, the landside 21 being bifurcated at its forward end, one member 21$^a$ of which is adapted to rest above the mold-board, while the other member 21$^b$ is arranged beneath the same. The auxiliary standard can be arranged upon the same side of the beam as the main standard or upon the opposite side of the same.

From the above it will be seen that I provide a cheap and simple cultivator-plow for barring and dirting cotton and other plants, the mold-board plow serving to turn the dirt away from the plant, and by having a landside extending above and below the mold-board the plow is steadied and the dirt prevented from falling back upon the plant. The shovel-plow, being arranged to the rear of the mold-board plow, breaks the dirt turned back by the mold-board plow and immediately throws it back toward the plants, thus avoiding delay and preventing any damage from storm or other circumstances.

Having thus described my invention, what I claim, and desire to secure by Letters Patent, is—

1. The combination, with the main standard, of the mold-board secured thereto and the bifurcated landside secured to the side of the standard, one member of which is arranged above the mold-board and the other below the same, substantially as shown and described.

2. The combination, with a beam, of a main standard, the horizontal arm integral therewith, having a slotted pendent end, the auxiliary standard slotted longitudinally, and the brace-rods secured at one end to the beam and at the other to the auxiliary standard at its juncture with the bolts connecting the rods, arm, and auxiliary standard, substantially as shown and described.

3. The combination, with the stock or beam, of the main standard, the horizontal bar integral therewith and having a slotted pendent outer end, the auxiliary standard adjustably attached to the pendent end, the brace-rods and bolts connecting the beam and auxiliary standard, and the adjustable brace connecting the main standard and beam, substantially as shown and described.

J. P. COUCH.

Witnesses:
SAML. H. POWER,
JEFFERSON D. BELL.